United States Patent
Lin et al.

(10) Patent No.: US 9,100,569 B2
(45) Date of Patent: Aug. 4, 2015

(54) METHOD FOR ADAPTIVE FOCUSING

(71) Applicant: NATIONAL CHUNG CHENG UNIVERSITY, Chiayi County (TW)

(72) Inventors: Huei-Yung Lin, Chia-Yi (TW); Pu-Chuan Kang, Tainan (TW)

(73) Assignee: National Chung Cheng University, Chiayi County (TW)

( * ) Notice: Subject to any disclaimer, the term of this patent is extended or adjusted under 35 U.S.C. 154(b) by 35 days.

(21) Appl. No.: 14/161,859

(22) Filed: Jan. 23, 2014

(65) Prior Publication Data

US 2015/0116577 A1    Apr. 30, 2015

(30) Foreign Application Priority Data

Oct. 29, 2013   (TW) .............................. 102139061 A

(51) Int. Cl.
*H04N 5/232* (2006.01)
*G03B 13/36* (2006.01)
*G02B 7/36* (2006.01)

(52) U.S. Cl.
CPC .............. *H04N 5/23212* (2013.01); *G02B 7/36* (2013.01); *G03B 13/36* (2013.01)

(58) Field of Classification Search
CPC ... H04N 5/23212; H04N 5/238; G03B 13/00; G03B 13/18; G03B 13/32–13/36; G02B 7/36
See application file for complete search history.

(56) References Cited

U.S. PATENT DOCUMENTS

| | | | |
|---|---|---|---|
| 6,614,998 B1 * | 9/2003 | Senba et al. | 396/123 |
| 7,106,376 B1 * | 9/2006 | Anderson | 348/345 |
| 2010/0315528 A1 * | 12/2010 | Goh et al. | 348/222.1 |

* cited by examiner

*Primary Examiner* — Daniel M Pasiewicz
(74) *Attorney, Agent, or Firm* — Rosenberg, Klein & Lee

(57) ABSTRACT

A focusing method having depth-of-field adaptability and aperture adaptability is provided. The method is applied to an image capture unit. A plurality of first images are captured in an image capture window according to a plurality of objects for obtaining a plurality of distances between the plurality objects and the image capture unit. Thereby, a focus distance of the image capture unit is given. Then, according to a maximum value and a minimum vale of the plurality of distances, the first aperture is adjusted to a second aperture, so that the image capture unit can acquire a complete depth of field by means of the second aperture and the focus distance. Accordingly, the preferred focus distance and depth of field satisfying the requirements for theme or special depth of field can be acquired. In addition, image capturing can be performed for a shorter exposure time.

9 Claims, 5 Drawing Sheets

METHOD FOR ADAPTIVE FOCUSING

FIELD OF THE INVENTION

The present invention relates generally to a method for focusing, and particular to a method for adaptive focusing.

BACKGROUND OF THE INVENTION

In recent years, due to the advancement in image capturing and display techniques, people's requirement for image quality has become higher and higher; and associated applications for the image capturing and display techniques have been more and more widely performed. The camera function almost has been a necessary function in modern mobile devices such as smartphones, tablet computers and so on. Optical focusing for imaging in development and design of a camera is a crucial part. The automatically focusing system of a camera was under much attention extensively since early days. The development of the key techniques in the automatically focusing system always has been one of the emphases in research and development for camera manufacturers. Nonetheless, most focusing systems of image capturing apparatuses often can focus on a single object only. Even though modern digital cameras provide the multi-target auto-focusing function for focusing multiple objects at different distances concurrently, the acquired image cannot present effect of shallow depth-of-field accurately in the interested region for a user.

In general, a lens can concentrate the light from a fixed distance only. Images departing from the fixed distance will blur gradually. Nonetheless, within a certain range, the degree of image blur is imperceptible. This range is so-called the depth of field (DOF), which means the range of clear imaging for human eyes. The DOF of imaging is usually determined by the distance between the object and the camera lens, the focus distance of the camera, and the aperture value of the lens. As the aperture value of the lens is increased (namely, the aperture is shrunk), the DOF of imaging is increased; as the aperture value of the lens is decreased (namely, the aperture is enlarged), the DOF of imaging is decreased. In addition, change of the DOF is also made by different lens positions during photographing.

Normally, no matter professional cameras, such as digital single-lens reflex cameras, or consumer cameras, such as general entry-level digital cameras, the built-in optical focusing systems will only focus objects at a specific distance under a given DOF condition.

The influence of this limitation on the focusing operation for scenes having only one single object is less significant. However, for scenes having a plurality of objects located at different distances, there will be problems of choosing the focusing location for the objects and of the overall image clarity for the optical focusing system. Modern camera systems mostly adopt the so-called intelligent focusing method, by which image analysis tools are used for detecting the interested region in a frame and then the focusing location is set to this region.

Nonetheless, this intelligent focusing method cannot solve the focusing problem for a plurality of scene regions covering different DOFs concurrently. Thereby, the aperture should be adjusted smaller (namely, the aperture value should be increased) manually for obtaining a large focusing region. Consequently, it is not guaranteed that modern cameras can adjust automatically to the most appropriate aperture while photographing a plurality of objects for focusing the respective theme regions in the image concurrently as well as highlighting the subject in the scene by using the shallow-DOF effect. Besides, modern cameras cannot acquire the largest aperture satisfying the above criteria to photograph in order to reduce the exposure time while capturing images. Thereby, given a smaller aperture, the exposure time is extended, which increases the influence of object movement or camera shaking on capturing images.

In order to satisfy simultaneously the requirements of the effect of highlighting the photographing subject using a shallow DOF, focusing multiple objects at different distances, and using the largest aperture for image capturing while complying with the above criteria, the present invention provides an adaptive focusing method for solving the problems described above.

SUMMARY

An objective of the present invention is to provide an adaptive focusing method, which improves the image quality during image capturing. In particular, for specific requirements in DOF and exposure time, the present invention can adjust the focusing location and the aperture of a camera, so that the DOF covers the interested subjects in the image capture window only and the exposure time is reduced.

Another objective of the present invention is to provide an adaptive focusing method, which uses the captured image to give the distance between the respective subjects and the image capture unit, and further give the preferred focus distance and aperture. Thereby, the preferred DOF and exposure time are obtained.

In order to achieve the objectives and effects described above, the present invention discloses an adaptive focusing method applied to an image capture unit, which comprises an image capture window. First, the image capture unit captures a plurality of first images according to a plurality of objects contained in the acquirable field of the image capture window. After capturing the plurality of first images, the image information of the plurality of first images is obtained for acquiring a plurality of distances between the plurality of objects and the image capture unit. Then, a focus distance of the image capture unit is obtained according to the plurality of distances, where the focus distance is the average of the plurality of distances. Next, the image capture unit adjusts a first aperture to a second aperture according to a maximum value and/or a minimum value of the plurality of distances, so that the image capture unit acquires a complete DOF by means of the second aperture and the focus distance, and the plurality of objects are shown clearly in the complete DOF. Accordingly, the image capture unit having automatic focusing function according to the present invention can acquire adaptively the preferred focus distance and aperture and shorten the exposure time of the image capture unit correspondingly. By acquiring the preferred DOF and exposure time, the requirements for special DOF and theme as well as fast image capturing are satisfied.

DETAILED DESCRIPTION

In order to make the structure and characteristics as well as the effectiveness of the present invention to be further understood and recognized, the detailed description of the present invention is provided as follows along with embodiments and accompanying figures.

The present invention provides an adaptive focusing method for solving the focusing problem covering a plurality of regions with different DOFs in the intelligent focusing mode of modern digital cameras. In addition, the present invention can further provide the shallow-DOF effect for highlighting the photographed subject as well as reducing the required exposure time of photographing objects for reducing the influence of object movement or camera shaking on captured images.

Figure 1:
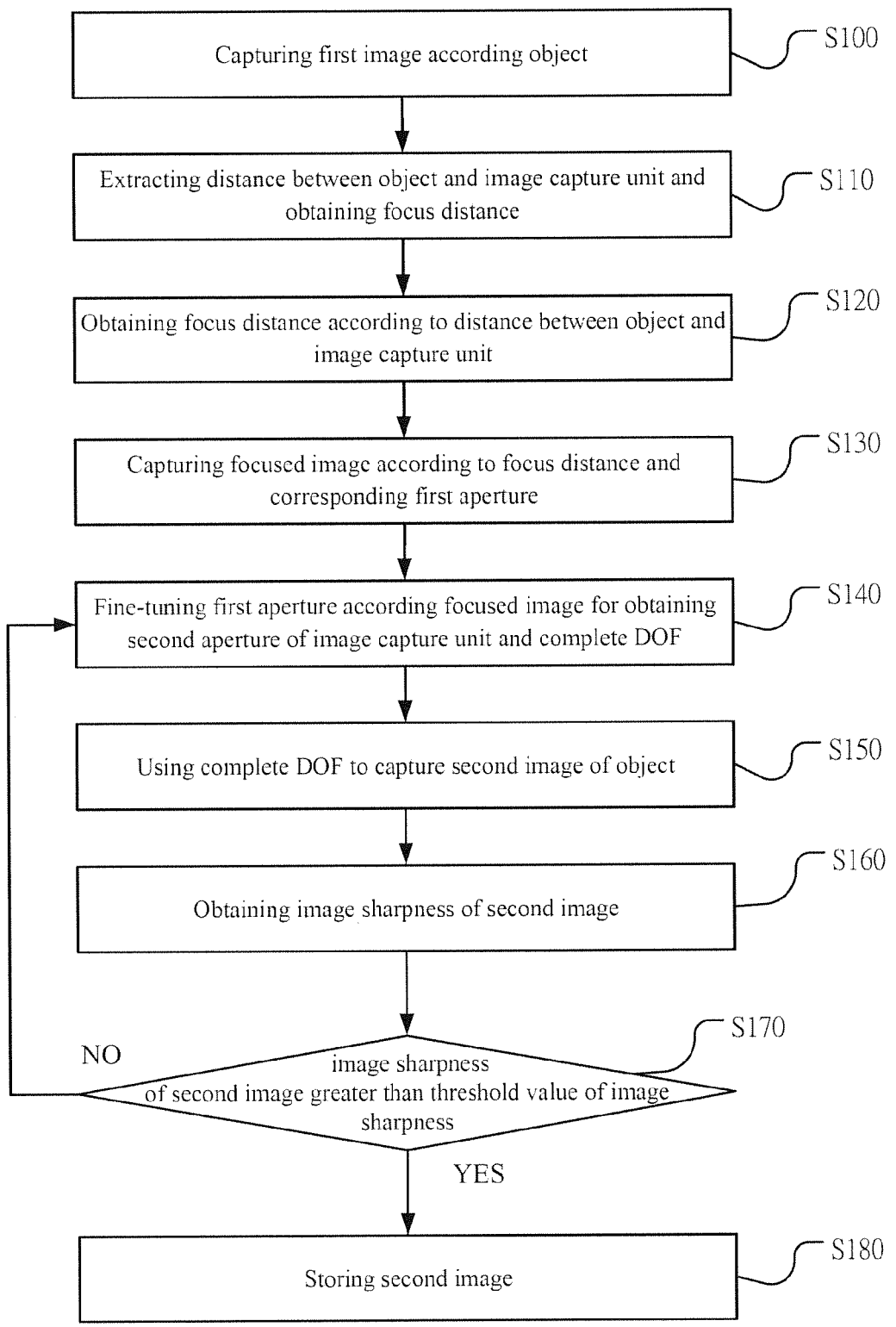
FIG. 1 shows a flowchart according to a preferred embodiment of the present invention.

Please refer to FIG. 1, which shows a flowchart according to a preferred embodiment of the present invention. As shown in the figure, the adaptive focusing method according to the present invention comprises the following steps:

Step S100: Capturing a first image according an object;
Step S110: Extracting the distance between the object and the image capture unit and obtaining the focus distance;
Step S120: Obtaining a focus distance according to the distance between the object and the image capture unit;
Step S130: Capturing the focused image according to the focus distance and a corresponding first aperture;
Step S140: Fine-tuning the first aperture according the focused image for obtaining a second aperture of the image capture unit and a complete DOF;
Step S150: Using the complete DOF to capture a second image of the object;
Step S160: Obtaining the image sharpness of the second image;
Step S170: Judging if the image sharpness of the second image greater than the threshold value of the image sharpness; and
Step S180: Storing the second image.

Figure 2:
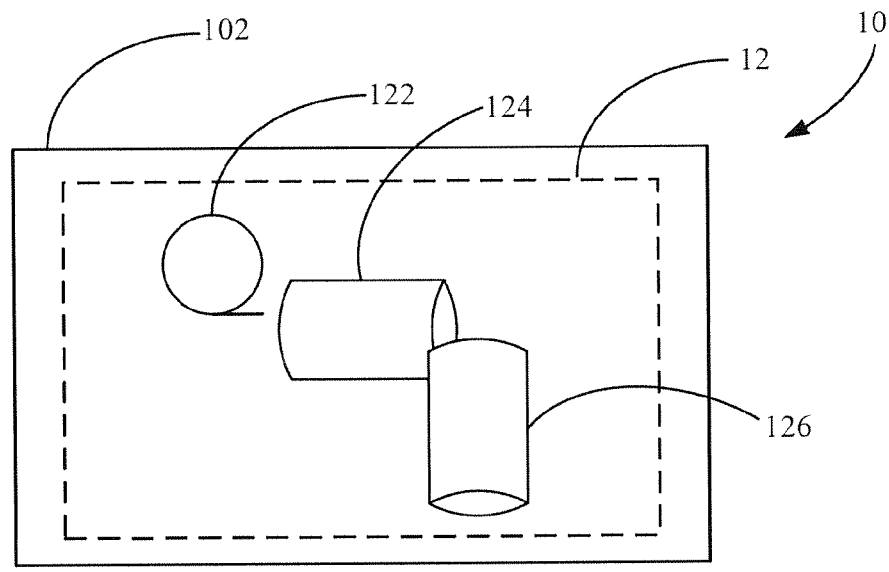
FIG. 2 shows a schematic diagram of the image capture window according to a preferred embodiment of the present invention.

In the step S100, as shown in FIG. 2, the image capture unit 10 has a display 102, which includes an image capture window 12. In the image capture window 12, there are a plurality of objects in the acquirable field. For example, the image capture window 12 in FIG. 2 contains the first object 122, the second object 124, and the third object 126. The plurality of objects has different distances to the image capture unit 10, respectively. The image capture unit 10 captures a first image for each of the plurality of objects via the image capture window 12, respectively, and thus obtaining a plurality of first images. In the step 110, in general, a digital photo take by a digital photographing device can contain a file in the exchangeable image file format (Exif) for recoding the attribute parameters and photographing data of the digital photo. Thereby, the Exit files of the plurality of first images can be used as the image information. For example, the following Table 1 shows:

TABLE 1

| Item | Information |
| --- | --- |
| Manufacturer | Pentax |
| Model | Pentax K-30 |
| Orientation | Normal (upper-left) |
| X-resolution | 300 dpi |
| Y-resolution | 300 dpi |
| Exposure time | 0.00800 ($1/125$) sec |
| FNumber | F22 |
| Mode | Aperture priority |
| ISO value | 100 |
| EXIF version | 0230 |
| Date and Time (original) | 2005:09:25 15:00:18 |
| Date and Time (digitized) | 2005:09:25 15:00:18 |
| Exposure compensation (EV+−) | 0 |
| Metering mode | Spot |
| Flash | Off |
| Focal length | 35 mm |
| Focal length 35 mm equivalent | 52 |
| Lower limit of focus distance | 0.58 m |
| Upper limit of focus distance | 0.76 m |
| Color space | sRGB |
| PixelXDimension | 4928 pixel |
| PixelYDimension | 3264 pixel |

Figure 3A:
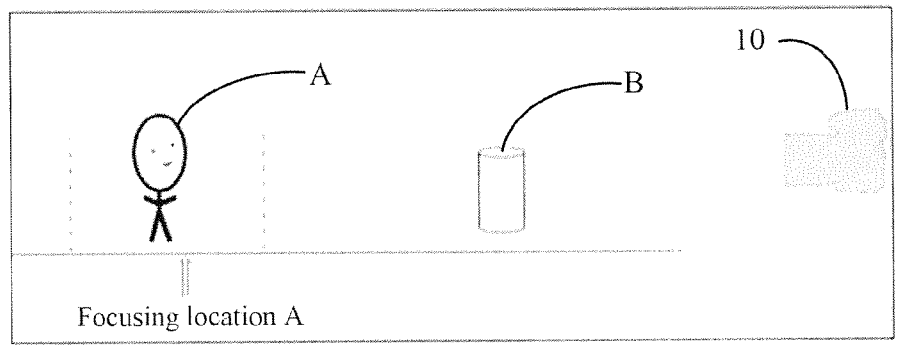
FIG. 3A shows a partial schematic diagram of the focus distance according to a preferred embodiment of the present invention.
Figure 3B:
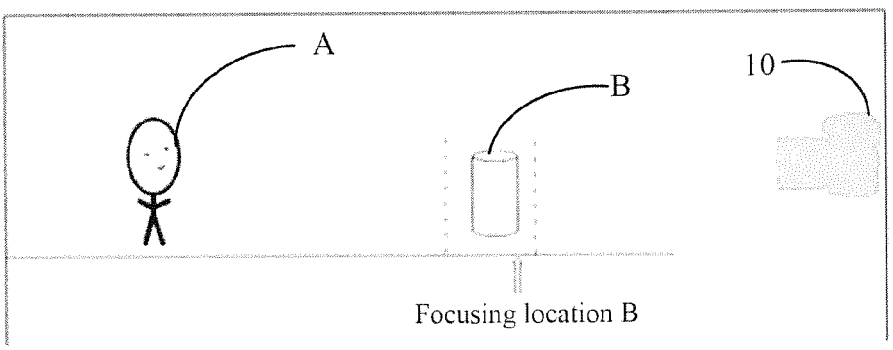
FIG. 3B shows a partial schematic diagram of the focus distance according to a preferred embodiment of the present invention.
Figure 3C:
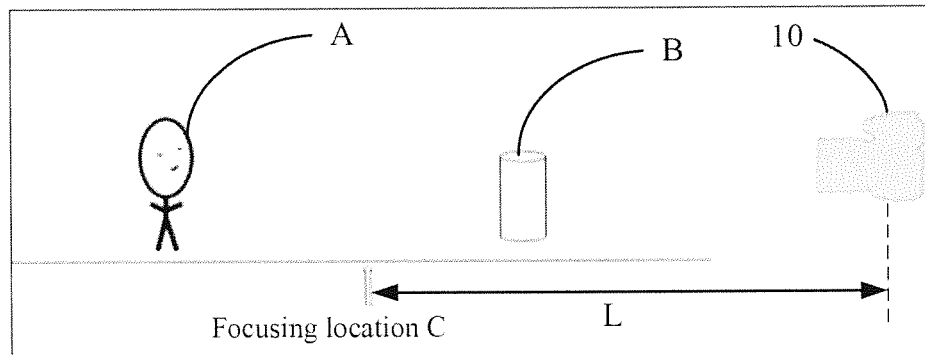
FIG. 3C shows a partial schematic diagram of the focus distance according to a preferred embodiment of the present invention.

As shown in Table 1, the range information of the physical focus distance of lens can be given from the image information. Hence, the distance between the plurality of objects and the image capture unit 10 can be acquired. Next, in the step S120, an average is given according to a plurality of distances between different objects and the image capture unit 10 and thus deducing an appropriate focus distance. As shown in FIG. 3A and FIG. 3B, the plurality of distances include at least a maximum value and at least a minimum value. The maximum value is the maximum distance between a farest object and the image capture unit 10; the minimum value is the minimum distance between a nearest object and the image capture unit 10. The image capture unit 10 captures the images of different objects A, B at different focusing locations, namely, the focusing location A and the focusing location B, for obtaining the focus distance L, which is the average of the focusing locations A, B. As shown in FIG. 3C, the focus distance L is the distance between the location of the sensor of the image capture unit 10 and the focusing location C. The range of the focus distance L is limited according to the lens of the image capture unit 10. For example, the focus distance L is between 0.58 m to 0.76 m (including 0.58 m and 0.76 m).

Figure 4:
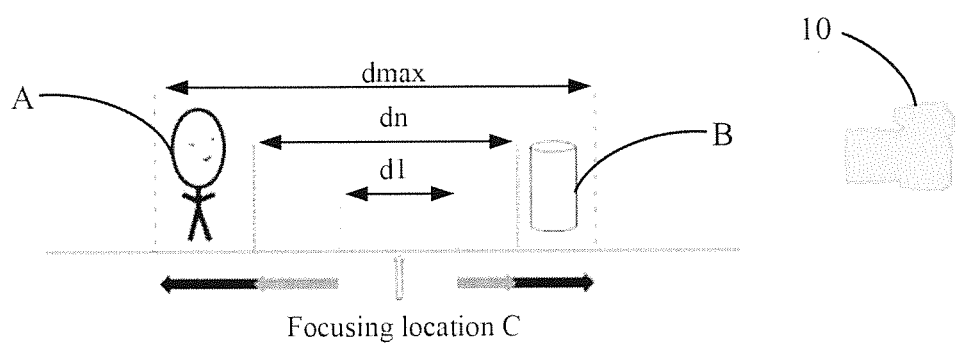
FIG. 4 shows a schematic diagram of the focus distance and the depth of field according to a preferred embodiment of the present invention.

In the step S130, after a general auto-focus digital camera acquires the focus distance L, it will adjust the aperture of the lens automatically to match the focus distance L. Accordingly, the focus distance L acquired from the step S120 and a corresponding first aperture can be used to capture the focused image of the plurality of objects. The focused image has an automatic DOF corresponding to the focus distance L and the first aperture. Nonetheless, not all of the objects can be shown clearly and concurrently in the automatic DOF. For example, as shown in FIG. 3C, the image capture unit 10 captures the focused image according to the focus distance L. The automatic DOF of this focused image does not cover the focused objects A, B. Thereby, the objects A, B will appear blurred in the focused image. In the step S140, because the DOF in the focused image is not sufficient for capturing the clear image of the objects A, B, the first aperture of the image capture unit 10 is fine-tuned. As shown in FIG. 4, the first aperture is the minimum aperture value and corresponds to the automatic DOF d1. Under the fixed focus distance L, a different aperture corresponds to a different DOF. Thereby, the n-th aperture corresponds to the n-th DOF dn. According to the present embodiment, the feasible aperture of the image capture unit 10 corresponding to the most appropriate DOF dmax is adopted for acquiring a complete DOF just covering the objects A, B with clarity. Nonetheless, the present invention is not limited to this embodiment. Different apertures can be adjusted according to the distances between objects, particularly according to the farest distance between a farest object of the plurality of objects and the image capture unit 10 or according to the nearest distance between a nearest object of the plurality of objects and the image capture unit 10, for acquiring the required DOF and shortening the exposure time of the image capture unit 10. Consequently, the requirement of the corresponding minimum exposure time is met, decreasing the influence of object movement or camera shaking on captured images.

Figure 5:
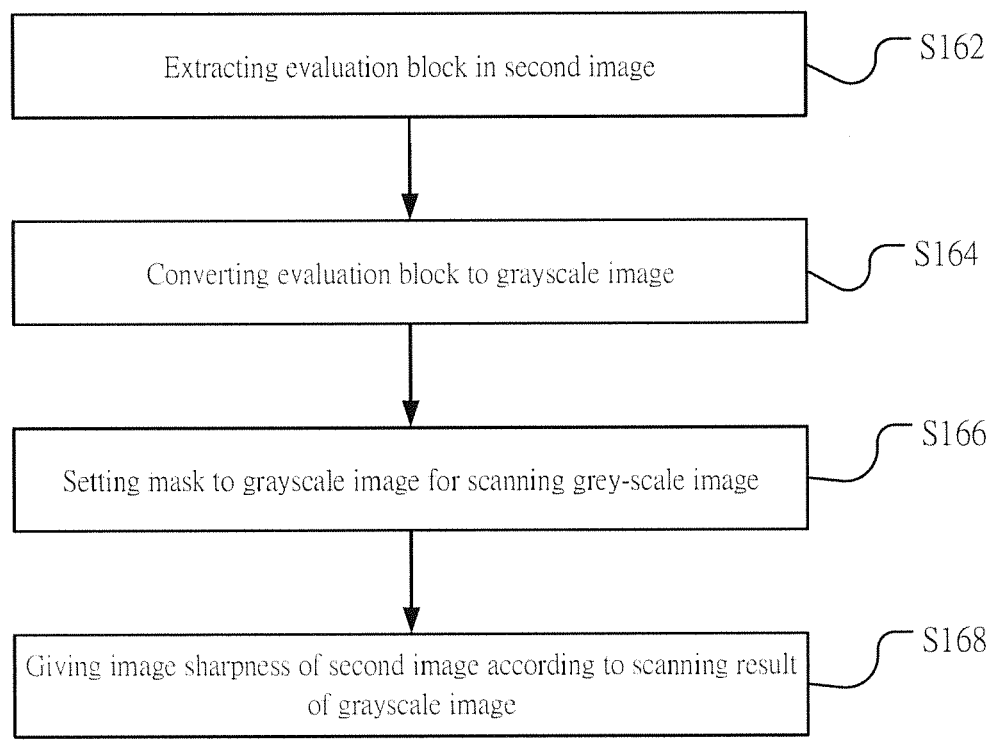
FIG. 5 shows a flowchart of acquiring image sharpness according to a preferred embodiment of the present invention.

In addition, the focusing method having DOF adaptability and aperture adaptability can be further applied to image capturing. In the step S150, the image capture unit 10 uses the complete DOF to capture the second image of the objects. For example, as shown in FIG. 3C, the image capture unit 10 according to the present embodiment uses the maximum DOF dmax to capture the second image covering the objects A, B. In the step S160, the image information in the second image is captured and obtaining the image sharpness of the second image. As shown in FIG. 5, the step S160 comprises the following steps:

Step S162: Extracting the evaluation block in the second image;
Step S164: Converting the evaluation block to a grayscale image;
Step S166: Setting a mask to the grayscale image for scanning the grey-scale image; and
Step S168: Obtaining the image sharpness of the second image according to the scanning result of the grayscale image.

In the step S162, the second image is divided into a plurality of blocks. A blurred-edged image is selected from the plurality of blocks and used as the evaluation block. In the step S164, the evaluation block captured in the step S162 is converted to a grayscale image. Then the step S166 is executed for setting a mask in the grayscale image of the evaluation block and scanning the grayscale image of the evaluation block. Next, in the step S168, the image sharpness of the grayscale image of the evaluation block is calculated according to the scanning result of the step S166. Thereby, the image sharpness of the second image is given according to the image sharpness of the grayscale image of the evaluation block.

Afterwards, in the step S170, the image sharpness of the second image acquired in the step S160 is compared with a threshold value of image sharpness of the image capture unit 10 for evaluating the image sharpness of the second image. When the image sharpness of the second image is greater than the threshold value of image sharpness, the step S180 is executed; when the image sharpness of the second image is less than the threshold value of image sharpness, the step S140 is executed for re-adjusting the aperture and obtaining a better second image. Finally, in the step S180, the second image having image sharpness satisfying the requirement is stored to the storage device connected electrically with the image capture unit 10.

Figure 6A:
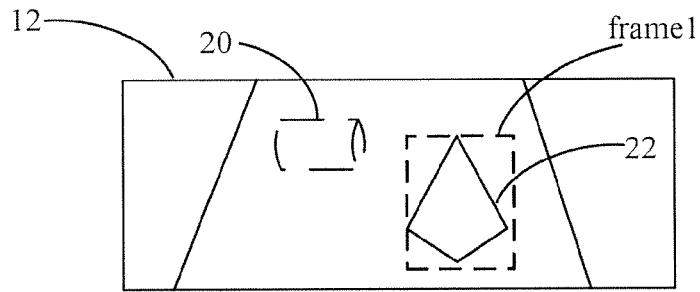
FIG. 6A shows a partial schematic diagram according to another preferred embodiment of the present invention.
Figure 6B:
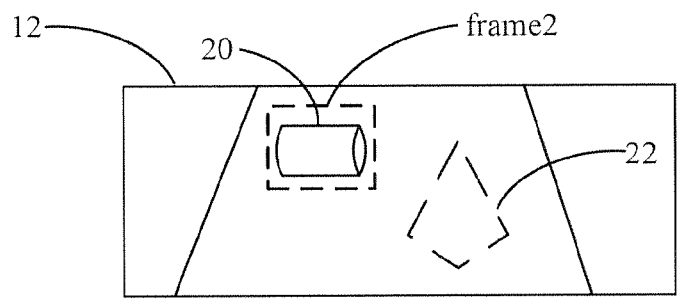
FIG. 6B shows a partial schematic diagram according to another preferred embodiment of the present invention.

Please refer to FIGS. 6A to 6D, which show schematic diagrams according to another embodiment of the present invention. In the figures, schematic diagrams of the method according to the present invention applied to practical photographing are shown. As shown in FIG. 6A, there are a doll object 20 and a jar object 22. The jar object 22 is closer to the image capture unit 10 than the doll object 20. Thereby, as the focus distance of the image capture unit 10 is close or equal to the distance between the image capture unit 10 and the jar object 22, a first focusing frame frame1 in the image capture window 12 is locked to the jar object 22. As shown in FIG. 6B, as the focus distance of the image capture unit 10 is close or equal to the distance between the image capture unit 10 and the doll object 20, a second focusing frame frame2 in the image capture window 12 is locked to the doll object 20.

Figure 6C:
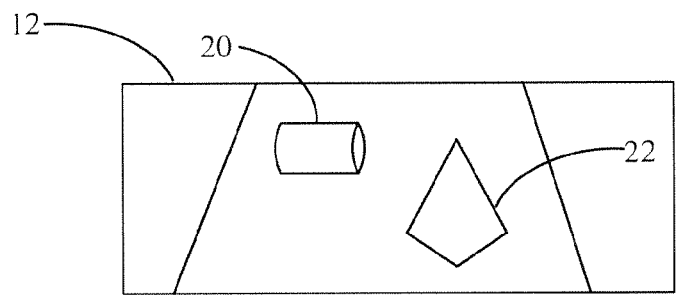
FIG. 6C shows a partial schematic diagram according to a preferred embodiment of the present invention.
Figure 6D:
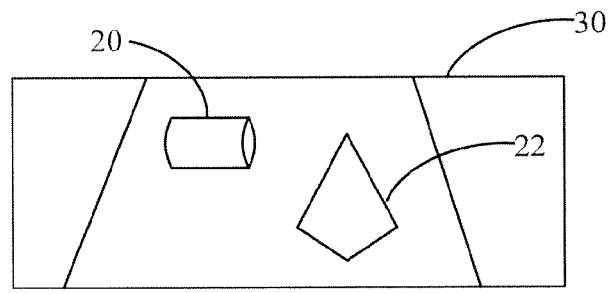
FIG. 6D shows a partial schematic diagram according to a preferred embodiment of the present invention.

As shown in FIG. 6C, after the image capture window 12 acquires the focus distance according to the images of objects taken by the photographing method of FIGS. 6A and 6B, the image capture window 12 will no longer generate the focusing frames on any object. In addition, the focused image will be captured by fine-tuning the aperture of the image capture unit 10, and obtaining a preferred DOF and a preferred exposure time concurrently. In other words, the shutter time of the image capture unit 10 is made shorter for decreasing the influence of object movement or camera shaking on captured images. Accordingly, as shown in FIG. 6D, after the image capture unit 10 acquires the preferred focus distance and DOF, an image having preferred DOF can be captured. Then the aperture is adjusted according to user's requirement for obtaining a preferred image satisfying the requirements for special DOF or theme design.

To sum up, the adaptive focusing method according to the present invention captures a plurality of images of objects at different focusing locations for obtaining an appropriate focus distance. The focused image is captured according to the focus distance for adjusting the aperture of the image capture unit, and thus obtaining the preferred DOF and exposure time. In addition, images can be captured using a preferred DOF. Then the images having image sharpness satisfying the required threshold value can be stored.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A focusing method having depth-of-field adaptability and aperture adaptability, applying for an image capture unit including an image capture window, and comprising steps of:

capturing a plurality of first images according to a plurality of objects contained in the acquirable field of said image capture window;

extracting the image information of said plurality of first images for acquiring a plurality of distances between said plurality of objects and said image capture unit;

obtaining a focus distance of said image capture unit according to said plurality of distances, and said focus distance being the average of said plurality of distances; and adjusting a first aperture to a second aperture according to a maximum value and a minimum value of said plurality of distances, and enabling said image capture unit to capture a second image according said plurality of objects and by means of said second aperture and said focus distance.

2. The focusing method of claim 1, further comprising a step of capturing a focused image according to said focus distance and said corresponding first aperture of auto-focusing after said step of obtaining a focus distance of said image capture unit, said focused image having an automatic depth of field where said plurality of objects fail to located in clearly.

3. The focusing method of claim 2, wherein said second aperture and said focus distance both correspond to a complete depth of field.

4. The focusing method of claim 3, wherein said automatic depth of field is less than said complete depth of field.

5. The focusing method of claim 4, wherein the aperture value of said first aperture is greater than the aperture value of said second aperture.

6. The focusing method of claim 4, wherein said first aperture is a maximum aperture.

7. The focusing method of claim 1, further comprising a step of evaluating said second image according to a threshold value of image sharpness after said step of extracting a second image, and storing said second image as the image sharpness of said second image is greater than said threshold value of image sharpness, alternatively re-executing said step of capturing said second image.

8. The focusing method of claim 7, and before said step of evaluating said second image according to a threshold value of image sharpness, further comprising steps of:
    extracting an evaluation block from said second image;
    converting said evaluation block to a grayscale image;
    setting a mask in said grayscale image for scanning said grayscale image; and
    obtaining the image sharpness of said second image according to a scanning result of said grayscale image for evaluating said second image.

9. The focusing method of claim 1, wherein said maximum value is the maximum distance between a farest object and said image capture unit, and the minimum value is the minimum distance between a nearest object and said image capture unit.

* * * * *